Sept. 25, 1951        H. H. CURRY        2,568,720

COMBINATION CONTROL SYSTEM

Original Filed May 28, 1946        3 Sheets-Sheet 1

INVENTOR.
HERMAN H. CURRY
BY
*M. C. Hayes*
ATTORNEY

Sept. 25, 1951  H. H. CURRY  2,568,720
COMBINATION CONTROL SYSTEM
Original Filed May 28, 1946  3 Sheets-Sheet 2

INVENTOR.
HERMAN H. CURRY
BY
ATTORNEY

Sept. 25, 1951 H. H. CURRY 2,568,720
COMBINATION CONTROL SYSTEM
Original Filed May 28, 1946 3 Sheets-Sheet 3
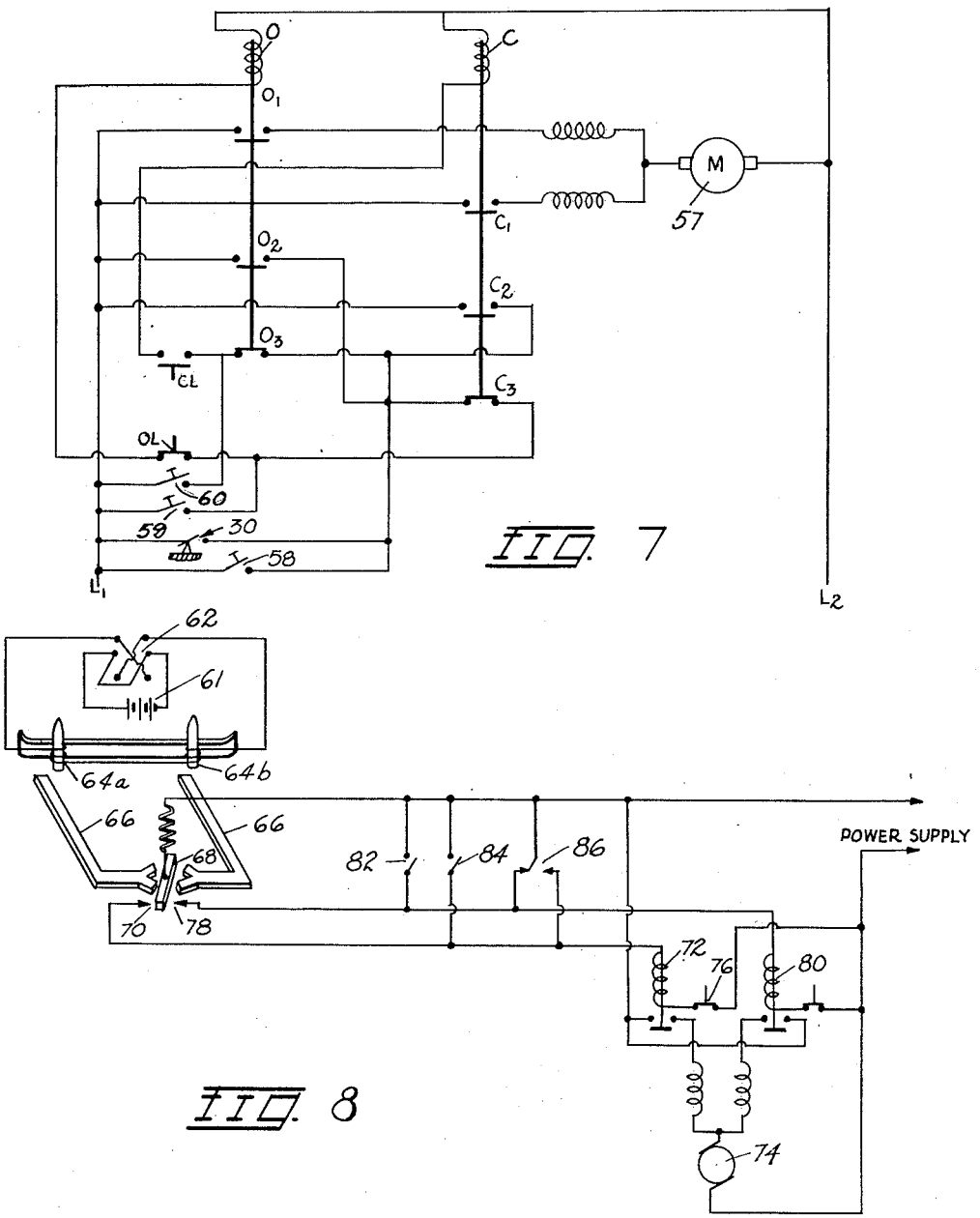
INVENTOR.
HERMAN H. CURRY
BY
ATTORNEY Patented Sept. 25, 1951

2,568,720

UNITED STATES PATENT OFFICE 2,568,720

COMBINATION CONTROL SYSTEM

Herman H. Curry, Inverness, Fla.

Continuation of application Serial No. 672,899, May 28, 1946. This application May 19, 1950, Serial No. 163,041

17 Claims. (Cl. 171—97)

(Granted under the act of March 3, 1883, as amended April 30, 1928; 370 O. G. 757)

This application relates in general to control systems, and in particular to electrical apparatus and circuits by means of which a remotely located electrical device can be operated from a vehicle.

Examples of the many applications of the present invention include the opening of garage doors, the operation of loading and unloading devices for industrial trucks, and the operation of switches for industrial locomotives all in response to a signal or signals from a push-button or other device located within the cab or driver's position in the respective vehicle.

An object of this invention is to provide electrical apparatus for operating a remote-located stationary electrical device from a vehicle by means of an electrical contact between a circuit to the electrical device and a control circuit within the vehicle.

Another object is to provide such a system wherein the electrical device is energized from an outside source of power or from a source of power located within the vehicle.

Another object is to provide apparatus for operating a remotely-located stationary electrical device from a vehicle by magnetic influence between the vehicle, or between a controllable magnetic-field-providing device on the vehicle, and a magnetic-field-sensitive element associated with the electrical device.

Further objects and advantages of this invention, as well as its construction, arrangement, and operation, will be apparent from the following description and claims in connection with the accompanying drawings, in which:

Fig. 7 is a circuit diagram for one form of the control apparatus; and,

Fig. 8 is a diagrammatic illustration showing still another form of magnetic-field-sensitive contact device in combination with a control circuit.

Figure 1:
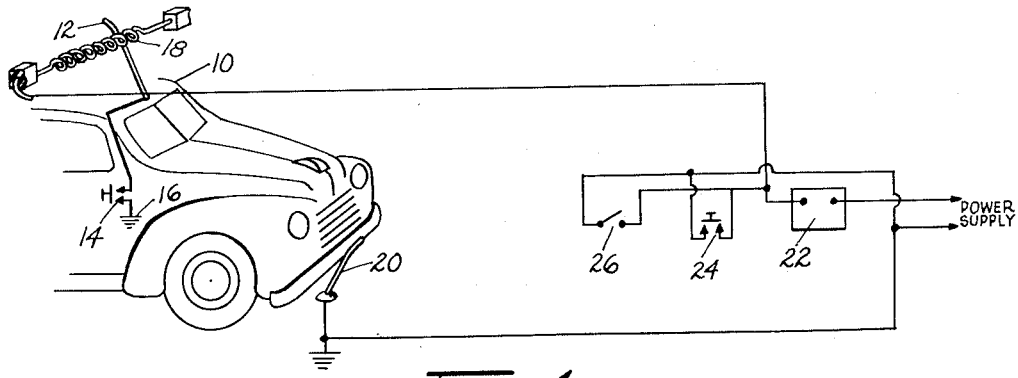
Fig. 1 is a diagrammatic illustration showing one embodiment of this invention wherein a control circuit within an automobile is connected to a stationary electrical device by means of wiping contact members.

Fig. 1 shows an automobile 10 equipped with a flexible contact member 12, such as a radio antenna, that is connected through a push-button switch 14 to the automobile chassis as represented by ground 16. The member 12 is otherwise insulated from the vehicle. The push-button switch 14 is conveniently located for operation by the driver and may, for example, be placed upon the dash of the vehicle.

Permanently mounted in the driveway, or other location from which control is desired, are a spring contact 18 adapted to make wiping contact with the antenna 12 of the vehicle, and a second spring contact or flexible member 20 adapted to make wiping contact with any other part of the vehicle, such as the bumper as shown. When the vehicle is in the proper position the closing of push-button 14 completes a circuit from the power supply through the vehicle to an electrical device 22, which may be a motor for operating garage doors or for performing other desired functions.

If the device 22 is to be used for operating a garage door, a push-button contact 24 is located within the garage for operating the door from within, and a key operated switch 26 in parallel with push-button 24 is located on the outside of the garage for operation from without.

Figure 2:
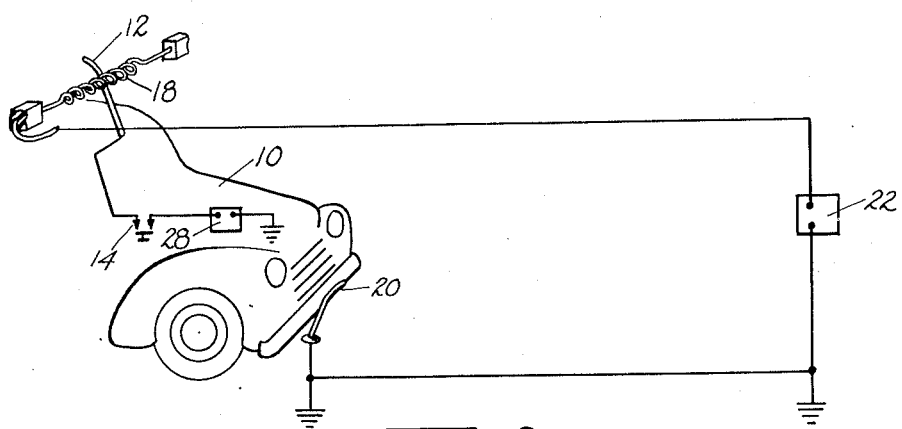
Fig. 2 is a modification of the system of Fig. 1 wherein the source of power for operating the electrical device is located within the automobile.

In the modification shown in Fig. 2, power for operating the device 22 is supplied from a battery 28 within the vehicle.

Figure 3:
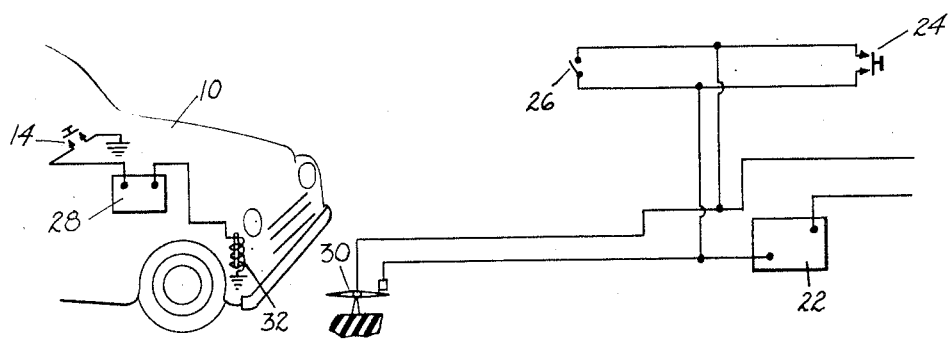
Fig. 3 is a diagrammatic illustration showing means mounted on the automobile for setting up a magnetic field, and a stationary magnetic-field-sensitive contact device operable in response to the magnetic attraction of said field to complete the control circuit.

In the modification shown in Fig. 3, a controllable magnetic field is used to operate the device 22 by means of a magnetized compass needle 30, or other sensitive magnetic contact device. The magnetic contact device 30 can be mounted, for example, in the side of an opening in a garage door and can be operated in response to a magnetic field set up by an electromagnet 32 mounted within the front fender, or other convenient position within the vehicle, and energized from battery 28 through push-button contact 14. Alternatively, the magnetic contact device 30 can be made to respond to a permanent magnet on the vehicle, such as, for example a magnetized bumper, or can be made to respond to the magnetic influence of the vehicle itself.

In order to increase the security of such a system, the electrical device 22 can be combined with one or more of the combination lock features as described in my copending application, Serial No. 618,601, filed September 25, 1945, now Patent No. 2,562,176. If desired, however, the magnetic contact can be used directly to operate a door-operating or other controllable device, relying on the uniqueness of the vehicle so equipped to give sufficient security. The relative placement and polarity of the magnetic-field-sensitive device at the door and the solenoid on the vehicle allows further combinations reducing the chance that any other vehicle so equipped could operate the device. A preferable method of installation is such that the distortion of the earth's magnetic field by the presence of the vehicle tends further to separate the contacts while the field of the solenoid when energized is of such polarity as to close the contacts.

Figure 4:
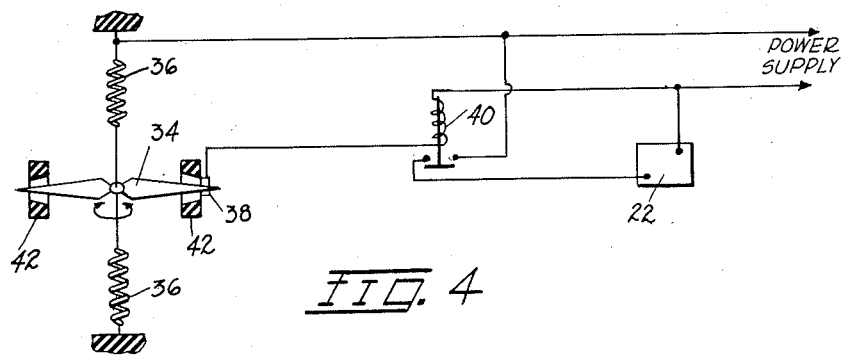
Fig. 4 is a more detailed view of one form of the magnetic-field-sensitive contact device.

A magnetic-field-sensitive device as contemplated herein is shown in Fig. 4. This form of the device comprises a magnetized compass needle 34, supported by a pair of torsionally flexible coil springs 36 of fine wire, and under influence of a magnetic field making contact with a contact member 38. This completes a control circuit as through a sensitive relay 40 in a circuit to the electrical device 22. Insulated stop members 42 limit motion of the needle 34 and prevent damage to the springs 36.

Figure 5:
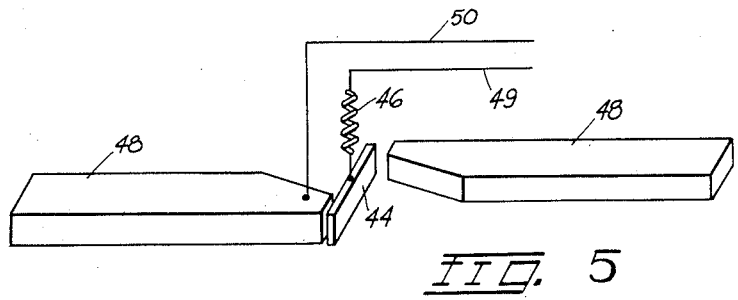
Fig. 5 is a diagrammatic illustration of another form of magnetic-field-sensitive contact device.

Fig. 5 shows another magnetic-field-sensitive device wherein a magnetized armature 44 is suspended by a spring 46 between a pair of flux-collecting bars 48. These bars preferably have high permeability at low flux density in order to increase the sensitivity of the device to the magnetic field when the bars are properly aligned with the local field of the electromagnet on the vehicle. The contact device can thus be of comparatively cheap and crude but reliable construction.

A circuit is completed, under proper magnetic influence, from conductor 49 through spring 46, magnetized armature 44 and one of the flux-collecting bars 48 to a return conductor 50.

By tuning the contact device, as for example, by making the moment of inertia of the moving magnet and the spring constant of the suspending spring such as to be resonant at a desired frequency, the magnetic device can be made responsive to a pulsing magnetic field of the resonant frequency only, and thus several such devices can be controlled by varying the field at particular frequencies. The pulsing magnetic field referred to herein can be produced, in the battery 28 and electromagnet 32 arrangement of Fig. 3, by modulating, as with push button 14, the current in the electromagnet 32, in accordance with any predetermined code of pulse frequency and duration.

For such resonant operation, it is preferable to mount a moving contact resiliently on the armature to give a longer duration of contact on each oscillation of the armature after the oscillations of the armature have been built up to an appreciable value.

Figure 6:
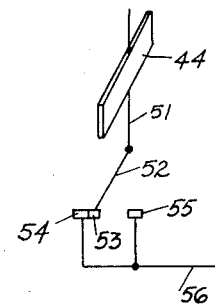
Fig. 6 is a modification of the device shown in Fig. 5.

Such an arrangement is shown in Fig. 6, wherein a shaft 51 extends from the armature 44 along its axis of rotation. A resilient arm 52 carrying a contact member 53 projects normally from the shaft 51. When the armature attains the proper degree of rotation, contact member 53 makes contact with a stationary contact 54 on the forward swing and with stationary contact 55 on the backward swing, thus completing a circuit through the armature 44, shaft 51, arm 52 and contacts 53, 54 or 55 to conductor 56. The spring constant is such that the armature 44 will not be sufficiently influenced by the presence of a steady magnetic field to cause the contact to be made. The armature in response to a pulsing magnetic field of proper frequency will, however, overcome the opposition of the spring allowing contact to be made after the oscillations have properly built up.

The tuned resonant contacting arrangement, above-described in connection with Fig. 6, is readily adaptable to the disclosures of Figs. 3 and 5 as well as that of Fig. 8, to be described. This arrangement may, therefore, be provided or utilized in each of these embodiments, if desired or required in a particular use.

Fig. 7 shows a control circuit adapted to be used with any one of the magnetic field operated contact devices, generally designated as 30, to control a motor 57 which may for example, open and close a garage door. The motor 57 is preferably a split-field reversible series motor suitable for high-torque intermittent duty. The circuit to the motor is controlled by two three-pole solenoid contactors, one as at C for closing and another as at O for opening, and by limiting switches, designated as OL and CL, that stop the motor at the limit of door travel in opening and closing, respectively. A push-button switch 58 is provided for opening and closing the door from an opened or closed position and a pair of push-button switches 59 and 60 are further provided for opening and closing the door from any door position.

If the door is in closed position, the limit switch CL will be opened and the only possible movement in response to closing control circuit will be to open the door. $C_1$, $C_2$, $O_1$ and $O_2$ will be open, and $C_3$ and $O_3$ will be closed, CL will be open and OL closed. Momentary contact of switch 30, 58 or 59 will complete a circuit from $L_1$ through solenoid O to $L_2$. This causes contacts $O_1$ and $O_2$ to close and $O_3$ to open. A circuit through $O_2$ then causes solenoid O to remain energized. A circuit from $L_1$ through $O_1$ starts the motor 57, initiating the door opening operation. When the door is fully opened the limit stop OL opens, causing solenoid O to become deenergized returning contacts $O_1$, $O_2$, and $O_3$ to their normal positions. It will be noted that the solenoid C could not be energized when the door was closed because switch CL was open. Then, as soon as solenoid O was energized normally, closed contact $O_3$ was opened locking out the door closing circuit until the door was completely opened.

In a similar manner a momentary contact of switch 30, 58 or 60 after the door is fully opened will close the door by energizing solenoid C which closes $C_1$, $C_2$ and opens $C_3$ until the door is closed, at which time the limit switch CL opens deenergizing solenoid C and restoring all contacts to their original positions.

If desired, for greater security, a combination locking device as disclosed in my previously mentioned application, Serial No. 618,601, filed September 25, 1945, can be inserted between contact 30 and/or 58 and the operating relays and switches 59 and 60 can be eliminated.

A further modification is shown in Fig. 8 wherein a polarized magnetic relay is utilized to close selectively one of two circuits. In Fig. 8, 61 represents a source of power within the vehicle, such as the storage battery. This is connected through a double-pole, double-throw switch 62 to a pair of solenoids 64a and 64b concealed in the bumper guards as indicated, or located in another convenient position upon the vehicle, and so arranged that the bottom of one is of south polarity while the bottom of the other is north polarity. If the vehicle is over flux-collecting bars 66 which may be buried in the driveway, an appreciable amount of magnetic flux would flow from one of the solenoids, as 64a, through the bars 66 to the other solenoid, as 64b, and through the bumper to complete the magnetic circuit. Should the relay pole of 64a be of north polarity it would attract the south pole of the magnetized armature 68 and closes normally open contact 70 to, for example, energize a solenoid 72 completing a circuit from the power supply through one field of a split-phase motor 74 to open a garage door or to perform other desired functions. When the motor has completed the desired function, the normally closed limit switch 76 opens causing relay 72 to be deenergized.

In a similar manner, the solenoids 64 can be energized with a reverse polarity by operating reversing switch 62. This causes contact 78 to close operating the relay 80 in the other field circuit of the motor 74. Manually operated pushbuttons 82 and 84 can be used to open and close the circuit through either of the motor fields and a key operated single-pole, double-throw switch 86 can control either of these circuits from an outside source.

As noted above, if necessary or desired, the contacting arrangement including armature 68 may be of the tuned resonant type described in connection with Fig. 6 so that actuation of the contacting arrangement may be obtained only in response to variable magnetic influences of a frequency value determined by the natural mechanical frequency of such a tuned contacting arrangement.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

This application is a continuation of my copending application entitled Combination Control System, Serial No. 672,899, filed May 28, 1946, abandoned.

What is claimed is:

1. A system for operating an electrical device from a vehicle comprising means for completing a circuit between said electrical device and a source of power, said means including a pair of contact members, one of which is adapted to make a wiping contact with the chassis of said vehicle, means on said vehicle insulated from the chassis thereof for simultaneously making wiping contact with the other of said contact members, circuit means between said insulated means and the chassis of said vehicle, and a switch in said circuit means located in a readily accessible position for operation by the driver of said vehicle.

2. A system for operating an electrical device from a vehicle comprising means for completing a circuit to said electrical device, said means including a pair of contact members one of which is adapted to make a wiping contact with the chassis of said vehicle, means on said vehicle insulated from the chassis thereof for simultaneously making wiping contact with the other of said contact members, circuit means between said insulated means and the chassis of said vehicle, said circuit means including a source of power and a switch located in a readily accessible position for operation by the driver of said vehicle.

3. A magnetic control device comprising means defining a pair of flux-collecting poles, said means being adapted to be disposed below the surface of a driveway of a vehicle having means for transmitting a variable magnetic field in the vicinity of said pole-defining-means, an armature movably mounted between said flux-collecting-pole defining means, a torsional spring suspending said armature between said poles in normally out-of-contact position, and electrical circuit means attached to said spring and to one of said flux-collecting poles, whereby in response to a change in the magnetic flux between said poles said armature moves into contact with said poles.

4. A magnetic control device comprising a pair of flux-collecting poles disposed beneath the surface of a driveway of a vehicle having means for transmitting a magnetic field in the vicinity of said poles, a magnetized armature mounted for limited rotative movement between said poles, a torsional spring suspending said armature between said poles in normally out-of-contact position, a part of said armature being adapted to provide a contact surface, electrical circuit means attached to said spring and to one of said pole members, said armature being so polarized as to close said contact in response to a magnetic field of predetermined polarity.

5. A control device responsive to a pulsating magnetic field comprising a pair of flux-collecting poles, a polarized armature between said poles, an electrical contact element carried by said polarized armature and adapted to make contact with a stationary contact element upon movement of said armature between said poles, said armature being suspended between said poles by an undamped torsional spring, the spring constant thereof being of such value as to limit the movement of said armature under the influence of a steady magnetic field but to allow greater movement to be made upon oscillation of said armature in response to a pulsating magnetic field varying at a frequency resonant with the period of the armature whereby said contact is made.

6. A system for selectively completing electrical circuits from a vehicle comprising a pair of spaced solenoids on said vehicle, circuit means energizing said solenoids from a source of power on said vehicle, a reversing switch in said circuit means whereby to reverse the polarity of said solenoids, a pair of flux-collecting poles extending in the driveway of said vehicle and spaced substantially the same distance apart as said solenoids, a magnetized armature mounted for limited rotative movement between said poles, a contact member mounted at each limit of rotation of said armature, resilient means normally holding said armature in out-of-contact position, circuit means adapted to be completed through said armature and contact members, said flux-collecting poles and armature being so arranged that said armature selectively makes contact with said contact members in response to magnetic flux from said solenoids dependent upon the polarity thereof.

7. A system for operating an electrical device from a vehicle, comprising tuned means for completing a circuit between said electrical device and a source of power, said means including a magnetic-field-sensitive device responsive only to magnetic influence variable at a predetermined frequency value, said device comprising a bar magnet, means supporting said bar magnet for oscillatory movement in said variable magnetic field, and contact means resiliently mounted on said supporting means, said bar magnet and said contact means being adapted for mechanical oscillation at a frequency equal to the predetermined frequency value of said magnetic field, and means on said vehicle for producing a variable magnetic field, whereby to operate said magnetic-field-sensitive device to complete said circuit.

8. Magnetic control apparatus, comprising means defining a pair of flux-concentrating members, said means being adapted to be disposed below the surface of a driveway of a vehicle having means for projecting a variable magnetic field toward said members, an armature, contact means actuatable by said armature, resilient means supporting said armature between said members and in spaced relation with said contact means, and circuit means including a controllable device and connecting said resilient means and said contact means, said circuit means being energizable by movement of said armature in response to changes in flux between said members.

9. The apparatus as in claim 8, wherein said contact means comprises a pair of contact points, one said point being on one said member, the other point being on said armature.

10. The appartus as in claim 8, wherein said contact means comprises a fixed contact point on one of said members, a pair of spaced contact points, and a resilient arm movable with said armature and carrying a movable contact point, the latter being adapted to contact said pair of points only when said armature responds to flux changes of predetermined frequency.

11. The apparatus as in claim 8, wherein said contact means comprises a fixed contact point engageable by said movable contact point in response to movement of said armature under a magnetic field of predetermined frequency.

12. The apparatus as in claim 8, wherein said contact means is formed of two parts, one being responsive to variable magnetic fields of any frequency, the other being responsive to variable magnetic field of predetermined frequency only.

13. The apparatus as in claim 8, further comprising insulating stop means limiting the angular displacement of said armature, said contact means comprising a contact point associated with said stop means.

14. Magnetic control apparatus comprising means defining a pair of flux-concentrating members, said means being adapted to be disposed below the surface of a driveway of a vehicle having means for projecting a variable magnetic field toward said members, an armature, contact means actuatable by said armature, resilient means supporting said armature between said members and in normally spaced relation with said contact means, and circuit means including a utilization device between said resilient means and said contact means, said circuit means being actuatable by movement of said armature into contacting relation with said contact means in response to changes in flux between said members.

15. Magnetic control apparatus, comprising a pair of magnetic members disposed below the surface of a vehicular driverway, a movable element, contact means actuatable by said element, said element being supported between said members and normally in spaced relation with said contact means, and circuit means energizable by movement of said element in accordance with changes in flux between said members.

16. Magnetic control apparatus, comprising means defining a pair of magnetic members, said means being adapted to be disposed below the surface of a vehicular driveway, an armature, a contact means actuatable by said armature, said armature being resiliently supported between said members and in spaced relation with said contact means, and circuit means energizable by movement of said armature in accordance with changes in flux between said members.

17. Magnetic control apparatus, comprising means defining a pair of magnetic members, said means being adapted to be disposed below the surface of a vehicular driveway, an armature, contact means actuatable by said armature, said armature being resiliently supported between said members and in spaced relation with said contact means, and circuit means including a controllable device and connecting said armature and said contact means, said circuit means being energizable by movement of said armature is accordance with changes in flux between said members.

HERMAN H. CURRY.

No references cited.